United States Patent
Gardner et al.

(10) Patent No.: US 8,306,195 B2
(45) Date of Patent: *Nov. 6, 2012

(54) VISUAL TEST AUTOMATION TOOL FOR MESSAGE-BASED APPLICATIONS, WEB APPLICATIONS AND SOA SYSTEMS

(75) Inventors: Kenneth C. Gardner, Menlo Park, CA (US); Craig R. Powers, San Francisco, CA (US); Robert Charles Holcomb, Sunnyvale, CA (US); Kendall J. Cosby, Aurora, CO (US); Tana Christine Jackson, Sunnyvale, CA (US); Charles A. Vazac, San Francisco, CA (US); Matthew Solnit, Mountain View, CA (US); Michael Hemmert, Scotts Valley, CA (US)

(73) Assignee: SOASTA, Inc., Mountain View, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/927,426

(22) Filed: Nov. 15, 2010

(65) Prior Publication Data

US 2011/0066892 A1    Mar. 17, 2011

Related U.S. Application Data

(63) Continuation of application No. 11/503,580, filed on Aug. 14, 2006, now Pat. No. 7,844,036.

(51) Int. Cl.
*H04M 1/64* (2006.01)
*G06F 3/01* (2006.01)
*G06Q 30/00* (2012.01)

(52) U.S. Cl. ............ 379/88.08; 705/26.8; 709/224; 714/37; 715/202; 715/711; 715/809

(58) Field of Classification Search ............ 379/88.08; 455/67.4; 705/7.38, 26.8; 709/204, 224; 714/37; 715/711, 809, 202; 717/107, 124, 717/127; 726/22

See application file for complete search history.

(56) References Cited

U.S. PATENT DOCUMENTS

| | | | |
|---|---|---|---|
| 6,542,163 B2 * | 4/2003 | Gorbet et al. ............... 715/711 |
| 6,817,010 B2 * | 11/2004 | Aizenbud-Reshef et al. 717/127 |
| 7,548,875 B2 * | 6/2009 | Mikkelsen et al. ........ 705/26.8 |
| 7,607,169 B1 * | 10/2009 | Njemanze et al. ............ 726/22 |
| 7,685,234 B2 * | 3/2010 | Gottfried ..................... 709/204 |
| 7,689,455 B2 * | 3/2010 | Fligler et al. ................ 705/7.38 |
| 7,725,812 B1 * | 5/2010 | Balkus et al. ................ 715/202 |
| 7,844,036 B2 * | 11/2010 | Gardner et al. ........... 379/88.08 |
| 2004/0205724 A1 * | 10/2004 | Mayberry ..................... 717/124 |
| 2007/0232237 A1 * | 10/2007 | Croak et al. ............... 455/67.14 |
| 2008/0059947 A1 * | 3/2008 | Anand et al. ................. 717/107 |
| 2008/0066009 A1 * | 3/2008 | Gardner et al. .............. 715/809 |
| 2011/0066892 A1 * | 3/2011 | Gardner et al. ................ 714/37 |

* cited by examiner

*Primary Examiner* — Gerald Gauthier
(74) *Attorney, Agent, or Firm* — The Law Offices of Bradley J. Bereznak

(57) ABSTRACT

In one embodiment, a graphical user interface ("GUI") enables the efficient composition and execution of a test of a message-based application, Web application, or SOA systems' capacity to receive, process and respond to message traffic. The GUI may be used to generate a test composition by dragging and dropping message clips onto one or more tracks. Each clip includes one or more message, with each track being organized into one or more bands. Each track and each band may run contemporaneously to send messages to a target device or application. It is emphasized that this abstract is provided to comply with the rules requiring an abstract that will allow a searcher or other reader to quickly ascertain the subject matter of the technical disclosure.

26 Claims, 13 Drawing Sheets

VISUAL TEST AUTOMATION TOOL FOR MESSAGE-BASED APPLICATIONS, WEB APPLICATIONS AND SOA SYSTEMS

This application is a continuation of application Ser. No. 11/503,580, filed Aug. 14, 2006, now U.S. Pat. No. 7,844,036 entitled, "VISUAL TEST AUTOMATION TOOL FOR MESSAGE-BASED APPLICATIONS, WEB APPLICATIONS AND SOA SYSTEMS", which is assigned to the assignee of the present application.

FIELD OF THE INVENTION

The present invention relates generally to electronic communication technology, more particularly, to automated systems and methods for testing and/or demonstrating aspects or features of message-based, intranet, Internet, or browser-based applications.

BACKGROUND OF THE INVENTION

Information technology is now routinely used by many enterprises to receive, process, and provide information via widely accessible electronic communications networks, such as the Internet. Yet most information technology systems will begin to deny service, or fail to process message traffic efficiently, when communications traffic exceeds a processing capacity of the system. Such failures in communication can significantly impair the operations of an enterprise in many ways.

Enterprises increasingly deploy Service Oriented Architecture (SOA) systems to expand their capabilities, increase their responsiveness to internal and external requests, and improve operational productivity. SOA is now being widely used to efficiently implement new Internet-based business processes, Web Services and other information processing protocols. SOA applications are often easily generated using commercially available Web Service orchestration tools in which message flow pathways are defined in accordance with intentional business logic.

Most SOA-based information technology systems and networks can integrate capabilities from an expanding and increasingly rich selection of available public services. Unfortunately, the communications burden placed on SOA systems that provide services via the Internet can be difficult to forecast. Almost any SOA system connected to the Internet will receive unpredictable levels of message traffic. The communications traffic capability of many SOA applications, even on a private network, such as the Intranet, can be difficult and expensive to test, measure or estimate. These difficulties in testing SOA applications are becoming increasingly problematic. The functionality and quality of web services is important, especially given that these services are often used for critical business applications. A consumer ordering a book from an on-line retailer, for example, needs to feel assured that the service will respond promptly and accurately to a specific request.

Prior art systems often require building a single use or disposable end-to-end system for testing the capacity of a website. For example, a web-services provider (such as a bank, an on-line retailer, or an electronic dating service) may need to know how many simultaneous user requests can come to their website given their website's configuration (i.e., its hardware, software, and connection to the Internet). Thousands of messages may be received by a particular website in any given moment, and software developers need to control the sequence, the timing, and the tempo of these messages to adequately performance-test the website's capacity. Similarly, there is a need for correctness testing of SOA-based applications.

Traditionally, developers have executed this type of test by building a long series of messages—typically using Extensible Mark-Up Language (XML) messages, which are messages in a human readable language format for tagging documents that are used by web services, to simulate real-world traffic. These XML messages are typically assembled by hand, using a programming language such as Perl or JAVA. Unfortunately, the testing process is highly prone to errors because even the smallest error (such as a difference in letter case) can invalidate the entire test. It is also an arduous and expensive process to write these scripts. Maintaining the scripts and updating them to reflect system changes is also a difficult process.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 11 illustrates a method for creating a composition in.

DETAILED DESCRIPTION

In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

According to one embodiment of the present invention, a visual or graphical user interface (GUI) is provided to allow business analysts, sales engineers, programmers, and other users (including non-programmers) to quickly build and maintain complex testing and demonstration scenarios for composite, message based applications, such as Web Services and SOA systems. The GUI is based on building blocks that allow a user to compose a test scenario by dragging and dropping various messages (in the form of icons or visual metaphors) onto different locations of the user interface screen. To facilitate understanding, the process of editing or assembling a procedure to generate complex, parallel message streams targeted at a message-based application may be considered analogous to the "cut-and-paste" process of editing or assembling a song, movie, or multi-media presentation in digital media presentation tools.

In accordance with a specific embodiment, messages may be combined into "clips" that can be reused. Clips are placed into "tracks" within "compositions" (with a set of rules to govern sequence, timing, and dependencies) utilizing a GUI with drag-and-drop capabilities. A user may also access the underlying message complexity. In this manner, a user may create sophisticated compositions that generate complex parallel message streams for testing and demonstration purposes.

Figure 1:
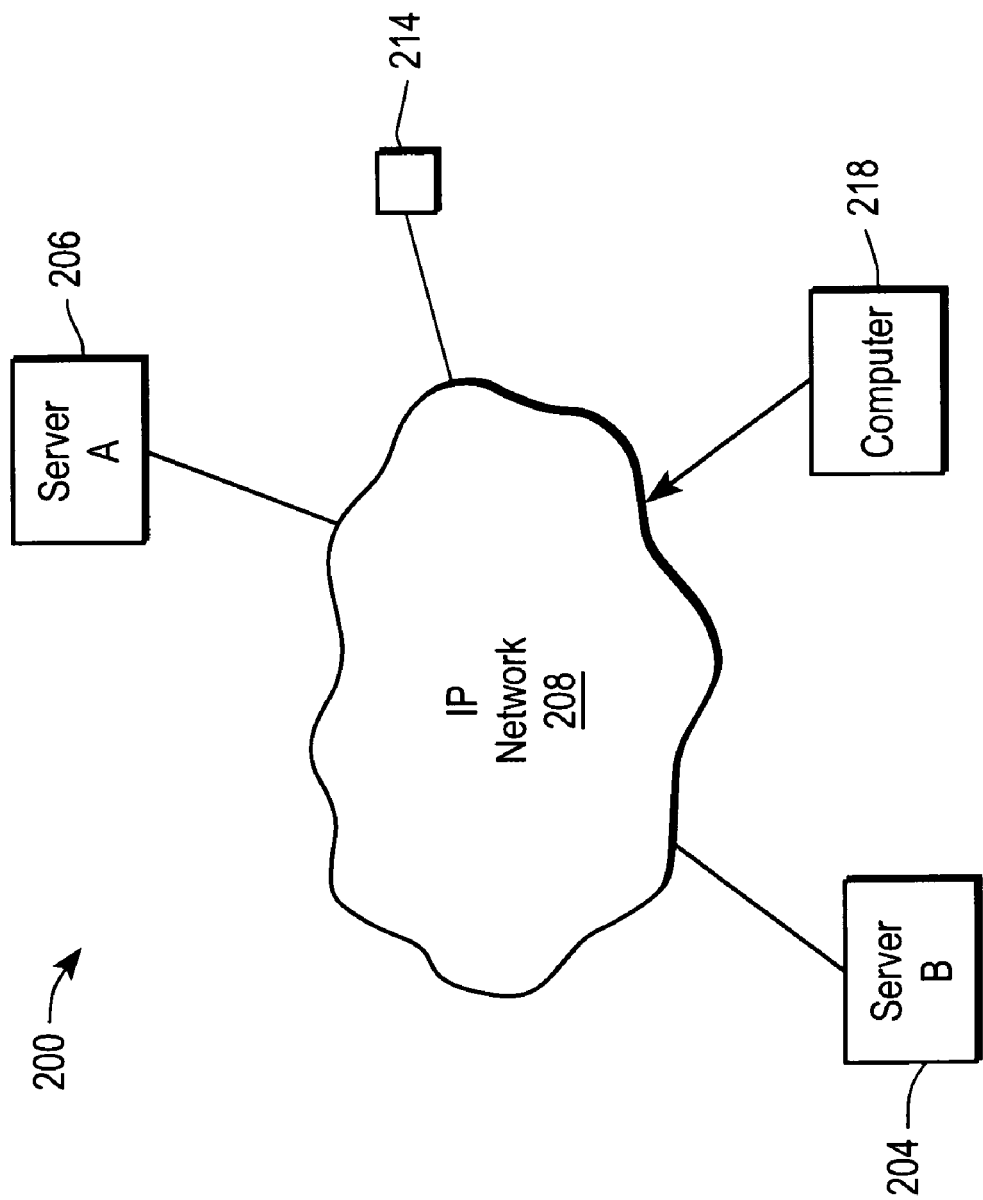
FIG. 1 illustrates an example communication network.

FIG. 1 illustrates an example communication network 200 that includes web servers 204 and 206 which communicate with computer 218 via Internet Protocol (IP) network 208. Computer 218 may be a general-purpose computer with a processing subsystem for executing a computer program that carrying out the functions and operations described herein. Computer 218 may be a personal computer (e.g., a laptop, a personal digital assistant, etc.) or a host with attached terminals. In the case where computer 218 comprises a personal computer (PC), the system and method described herein may be shared by the PC and any host system. Computer 218 may be configured to test and/or demonstrate the communications capacity of servers 204 and 206 by transmitting and receiving electronic messages to and from servers 204 and 206 via network 208. Servers 204 and 206 may also run one or more SOA applications.

Although FIG. 1 shows network 208 as comprising an IP network, in other embodiments network 208 may comprise any type of network including, but not limited to, a wide area network (WAN), a local area network (LAN), an ISDN network, a virtual private network (VPN), or a corporate Intranet. Network 208 may also be implemented using a wireless network or any kind of physical network implementation. FIG. 1 also shows a computer readable medium 214 that may be used to store information or which may be accessed by servers 204 or 206 to fetch information, programs, algorithms, or instructions stored therein.

Figure 2:
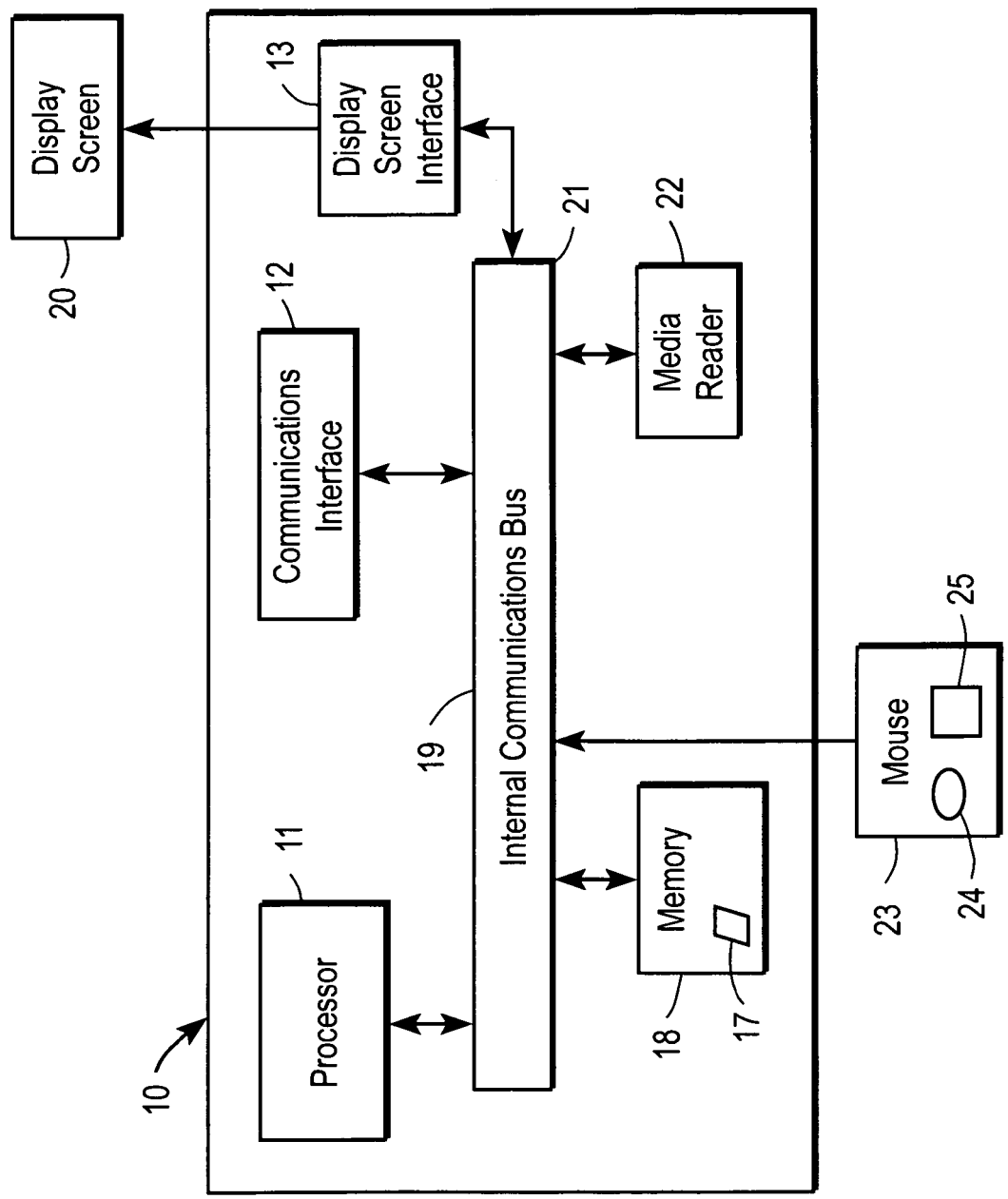
FIG. 2 is a block diagram of an example network device.

FIG. 2 is a block diagram of an example network device 20 such as may comprise any of the devices shown or described in conjunction with FIG. 1. Device 20 includes a processor subsystem 11 coupled with a memory unit 18, a network communications interface 12, a media reader 22, a cursor input device or mouse 23, a display screen interface 13, a display screen 20 and an internal communications bus 19. Processor subsystem 11, electronic memory 18, network communications interface 12, media reader 22, cursor input device or mouse 23 and display screen interface 13 are each coupled to internal communications bus 19. Network communications interface 12 may be connected with network 208 and enables processor subsystem 11 to transmit and receive electronic messages (via internal communications bus 19) to and from network 218 (e.g., the Internet). Electronic memory 18 stores information for provision to processor subsystem 11 via internal communications bus 19 as well as software encoded instructions that enable processor subsystem 11 to implement any of the functions described herein, e.g., those functions associated with creating message compositions for testing and demonstrating web services, accessing underlying message complexity for editing purposes, and/or utilizing drag-and-drop visual interface on display screen 20 using computer mouse 23. Processor subsystem 11 may also include cache memory and/or a real-time clock.

As used herein, selecting a graphical element includes placing a cursor on the graphical element (i.e., screen icon) and pressing a key on a selecting device, (e.g., a mouse 23) when cursor is visually positioned by display screen 20 on graphical elements. Dragging and dropping a graphical element includes placing a cursor on graphical element and pressing the select key on a selecting device, e.g., a select key 25 of mouse 23, when the cursor is visually positioned by display screen 20 on the graphical element, and then manipulating mouse 23 to position the cursor on another graphical element and then releasing select key 25. Mouse 23 may include a tracking module 24 to sense movement of mouse 23 along a substantially planar surface. Mouse 23 is also typically configured to enable a user of device 10 to drag and drop icons visually presented on display screen 20. Display screen 20 is coupled with the display screen interface 13. Processor subsystem 11 directs an image presented on display screen 20 by sending imaging information to display screen interface 13.

Media reader 22 is configured to read computer readable instructions stored by a computer readable media. According to one embodiment of the invention, a series of test electronic messages are provided by device 10 in response to processor subsystem 11 executing one or more sequences of instructions contained in memory 18. Such instructions may be read into memory 18 from another computer-readable medium, such as media 214 (see FIG. 1). Execution of the sequences of instructions causes processor subsystem 11 to perform the steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor subsystem 11 for execution. Such medium may take many forms, including but not limited to, non-volatile media, volatile media, and transmission media. Non-volatile media includes, for example, optical or magnetic disks, such as media 214. Volatile media includes dynamic memory, such as system memory 18. Transmission media includes coaxial cable, copper wire and fiber optic lines, including the wires that comprise internal communications bus 19. Transmission media can also take the form of acoustic or light waves, such as those generated during radio-wave and infra-red data communications.

Various forms of computer readable media may be involved in carrying one or more sequences of one or more instructions to processor 11 for execution. For example, the instructions may initially be carried on a magnetic disk of a remote computer. The remote computer can load the instructions into its dynamic memory and send the instructions over a telephone line using a modem. A modem local to network device 10 can receive the data on the telephone line and use an infra-red transmitter to convert the data to an infra-red signal. An infra-red detector can receive the data carried in the infra-red signal and appropriate circuitry can place the data on internal communications bus 19. Internal communications bus 19 carries the data to system memory 18, from which processor 11 retrieves and executes the instructions. The instructions received by system memory 18 may optionally be stored on media 14 either before or after execution by processor 11.

Figure 3:
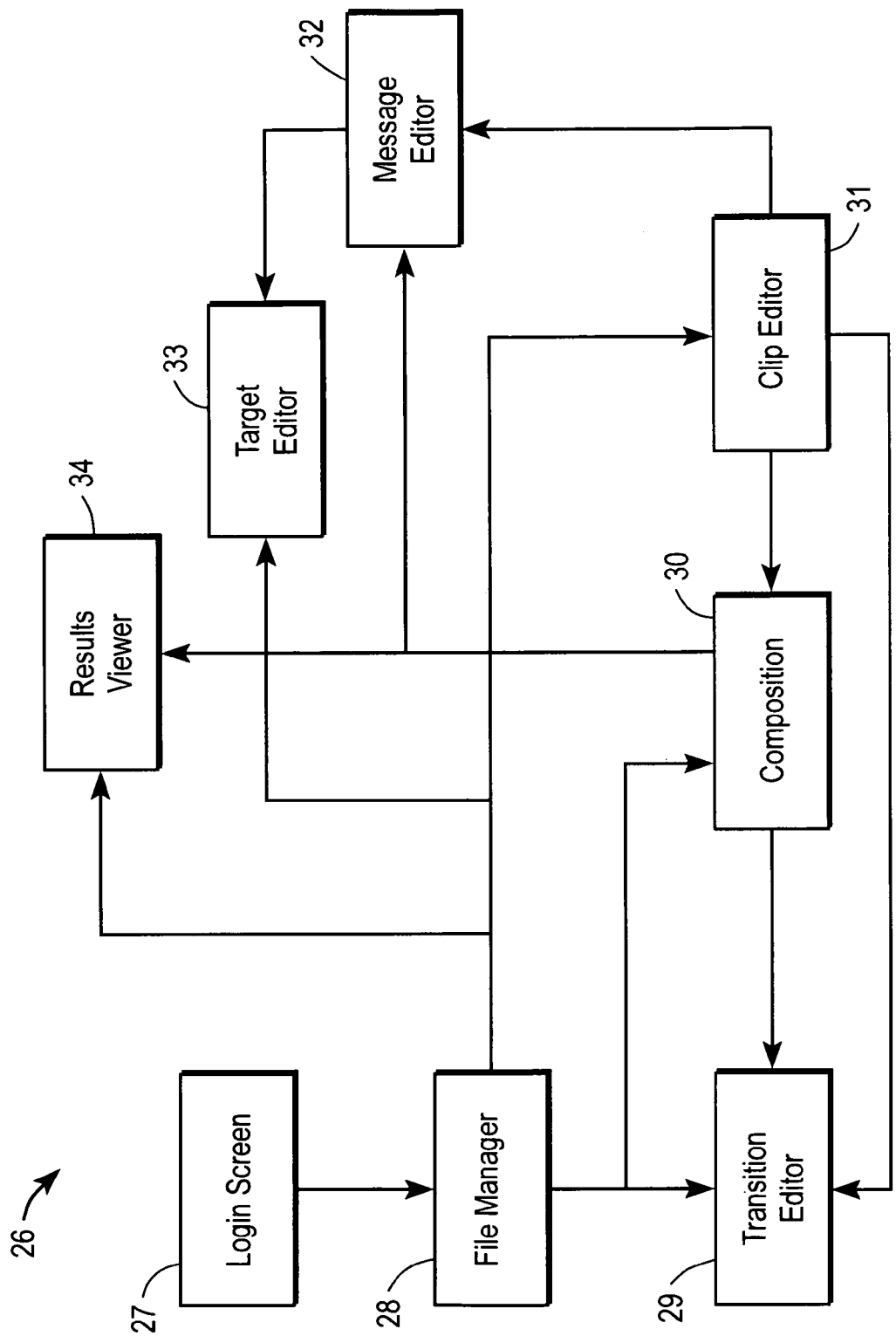
FIG. 3 illustrates various components of an example graphical user interface.

FIG. 3 illustrates various components of an example graphical user interface (GUI) 26 that may be implemented in any of the network devices shown in FIG. 1 or 2. GUI 26 may be stored in part or entirely in repository, i.e., a database memory 18, media 14, and/or in a distributed fashion on network 218. The major software (or firmware) components of GUI 26 may store and interchange information, which components may include a login screen 27, a file manager 28, a transition editor 29, a composition editor 30, a message clip editor 31, a message editor 32, a target editor 33 and a results viewer 34. The repository is used to store items associated with a composition, including the results produced from the test on the target.

A user may utilize GUI 26 to create complex message streams along a timeline and/or in sequence to test and/or demonstrate web services, such as a website. Thousands of messages may be put together into a composition, which can be played out according to a particular sequence, timing, and tempo that a user creates using various components of GUI 26. A composition in the context of the present application is simply a test or demonstration (which may comprise multiple messages organized in message clips) that may be played out to a particular target, such as a website.

For example, an online banking service may want to know its service capacity limits, i.e., how many simultaneous user service requests are possible until the website no longer functions or performs adequately. To test this capability, a user can utilize GUI 26 to create thousands of messages (i.e., user requests for online banking) and place them in a drag-and-drop fashion on a "play" composition screen of GUI 26. A user may then play the composition to test the capacity of the online banking service by pressing a single command button. By way of specific example, the composition may cause one request (in the form of a message to the on-line banking service) to be sent to the website in a first second of test operation, two requests the next second, three requests the third second, and so on, until performance begins to suffer appreciably, the service completely crashes, or some other problem caused by timing is discovered.

Login screen 27 is the first screen of GUI 26 seen by the user when the application is first invoked. Screen 27 is used to log onto the application by entering appropriate user identification (ID) and password information. After the user enters his user identification and password information into the login screen, the user may then access file manager 28.

File manager 28 enables the user to create, select, examine, modify, and execute a particular composition for execution on a target. In the course of so doing, the user may proceed from file manager 28 to any of the other editors/viewers including transition editor 29, composition editor 30, clip editor 31, target editor 33 and results viewer 34. Results viewer 34 visually presents information, values, and measurements obtained, generated or associated with one or more sessions of a composition. Basically, results viewer 34 is the module that informs the user—by a visual display of information on screen 20—of the performance and behavior of a server, and/or other addressees of electronic test message clips sent in the execution of one or more compositions.

The file manager user interface component provides a user with the ability to perform any one of a plurality of operations associated with the creation and execution of the composition comprising a plurality of parallel message streams. As described in more detail below, each message stream is organized in a track that includes a sequence of message clips. In one embodiment, the file manager user interface component has an administratively configured set of user privileges that control access to the operations by a given user.

In one embodiment, composition editor 30 comprises a module that allows a user to generate or edit a particular composition. In one embodiment, a composition consists of one or more parallel "tracks." In the context of the present application, a "track" is an individual timeline or sequence of message clips that contains messages to be sent. Message clips may be placed in tracks to define their sequencing, timing, and dependencies. Parallel tracks in a composition may thus be divided into "bands". The types of different bands include sequenced bands and time-based bands. A sequenced band contains sequenced message clips that are arranged to show the start-dependencies of the clips; that is, which clips must complete before another clip may be started. In contrast, a time-based band contains time-based message clips. These clips may be arranged on a time-scale to show when they are to be started, based upon the elapsed time from the start of the band. In one embodiment, a composition may contain any mixture or combination of sequenced and/or time-based bands, in any order. Typically, each band is completed before the next band starts.

An example of a composition layout that utilizes a combination of sequenced and time-based bands is an initial sequenced band that sends messages required to set up the test environment, followed by a time-based or sequenced band that performs the actual test, then followed by a final sequenced band that sends the messages required to terminate the test or clean-up after the test. For instance, if a user wanted to test a customer relations management system, setting up the test environment might first involve inserting all the customers needed to run the test. The test may then perform some operation on the customers, such as testing to see if their addresses could be changed. Finally, a clean-up operation after the test may involve removing all of the customers from the database.

In one embodiment, composition editor 30 enables a user to set the length of time of an execution of a composition, and to link a composition to other compositions, thereby permitting sequential, repetitive and/or simultaneous executions of one or more compositions (also referred to as "playlists"). Composition editor 30 thus allows a user to structure a composition to have one or more tracks and to structure one or more tracks to have one or more bands.

A specific implementation of composition editor 30 provides a user with the ability to add a new track and delete an existing track; to set a track's name, description, or tip text; to disable/enable a track; to define a new band and delete an existing band; to add a new message clip (linked, embedded or created "on-the-fly"); to delete an existing message clip; to move an existing message clip to a different location within a track, or to a different track; to adjust the size of an existing message clip; to randomize or otherwise modify the timing of an existing clip; to edit an existing message clip (drills into the clip editor); to change the displayed name, tip text, description, or thumbnail image of an existing message clip; and to cut/copy/paste tracks and message clips.

Compositions may be stored in whole or in part in the system memory 18 and/or the computer readable media 14. The user may add message clips to bands using computer mouse 23 by dragging and dropping icons onto band icons as described below in reference to FIGS. 7A and 7B. A given composition may be executed by the user from the composition editor 30 at any time. While a composition is playing, composition editor 30 may be invoked to show the composition's progress, e.g., as a function of time. When time-based bands are playing, a "playhead" shows the advance of time. For both sequenced and time-based bands there may also be a visual indication of the progress of the playing clips in each track. In certain embodiments, control buttons in the form of icons are provided to pause, resume, restart, or stop the playing of the composition. In addition, certain specific embodiments may include a control to increase or decrease the rate of play for time-based bands; and/or to keep repeating the play of a composition.

The user may move from composition editor 30 to message clip editor 31 or message editor 32 utilizing the GUI described herein. Message editor 32 is utilized by a user to generate or edit/modify messages. In the context of the present application, a "message" generally refers to a unit of data that can be sent via an electronics communications network, e.g., network 218, to another computational or communications system or device, e.g., to server 206 or 208. By way of example, a message could represent a communication sent to a queuing system, a REST call, or a HTTP request. A message could also be instantiated entirely or partially as a single operation, such as a web service call in any one of a variety of forms, e.g., XML, JMS, HTML, JSON, etc.

Message clips comprise a set of one or more messages that includes a specification of the timing and/or dependencies within that set of messages. In one embodiment, message clips may be shared by multiple compositions. Time-based execution delays may be built into a message clip, wherein two messages may be instantiated at different start times, as gauged from a start time of the message clip. It is also possible to create a dependent group of messages within the time-based clips that specifies that the first message in the group is to be sent at a specified time, but the remaining messages in the group are then to be sent one at a time only after a prior message has completed. The instantiation of messages within a message clip may be sequentially organized with dependencies, wherein one or more messages are not instantiated until one or more other messages within message clip have been executed.

A "transition" may optionally be inserted between each message. In the context of the present application a "transition" generally refers to a set of specified actions to be taken between the prior and the next message. Transitions may also be specified to execute upon certain events, such as "start of Track", "start of Clip", "failure of Message send", and so forth. A transition can be associated with a specific message. In one implementation, transition editor 29 allows a user to encode transitions that specify conditional actions to be taken between two message clips; that is, the actions are taken or executed between two message clips only when certain events or conditions occur. Transition editor 29 may also be used to edit properties, values or qualities of a message or a message clip. Transition editor 29 may also be used to write to log files, run JAVA code, etc.

Target editor 33 may be utilized to provide message clips with addresses to which message clips will attempt to communicate, and also to provide information about the allowable formatting of the data to be sent. A target is an item in the repository that represents the identity of a type of external application or system to which messages can be sent, such as a web service, a network address, a SOA service, a message queue, one or more servers (e.g., a Web Server), or any other type of computational or communications system or device that a user desires to test and/or demonstrate. A target may be defined as having multiple instances. A "target location" is the definition of a particular instance of a target, such as a specific individual implementation of a Web Service. The target location contains a complete specification of the physical location of an implementation of a target so that message streams can be sent to that target. The various locations of a particular target may be defined and edited using a target editor GUI. Note that in one embodiment target locations are defined for each target; that is, the location is part of the target—target locations are not independent items in the repository.

Message clip editor 31 is a portion or page of the GUI that allows a user to create and edit message clips. Messages may be presented in multiple ways. In addition, a user may switch among different views of a clip while viewing or editing it. For example, one view of a message clip may show messages within a clip according to the order in which they are to be sent. For time-based clips, the start time of each message may be displayed with numbers above the message. For sequenced clips, no times are shown, and the display illustrates dependencies (which messages must be sent before the next message may be sent). When nested clips are shown within the clip, the size of the nested clip may be the same size as the size of an individual message.

In one implementation, message clip views provide a way to create and edit the name of a clip; an optional description text (which may contain any text the user desires); an optional tip text line (a single line of text that is shown when the user is choosing from lists of clips elsewhere in the system); and an optional thumbnail image (i.e., an image used for display purposes when the clip is shown in other displays, such as the composition editor 30). Message clip editor 31 also allows user to add a new target/location pair, i.e., the destination of the message; delete an existing target/location pair; pick a different location for an existing target/location pair; change the local name for an existing target/location pair; and replace an existing target/location pair with a different target/location pair.

Figure 4:
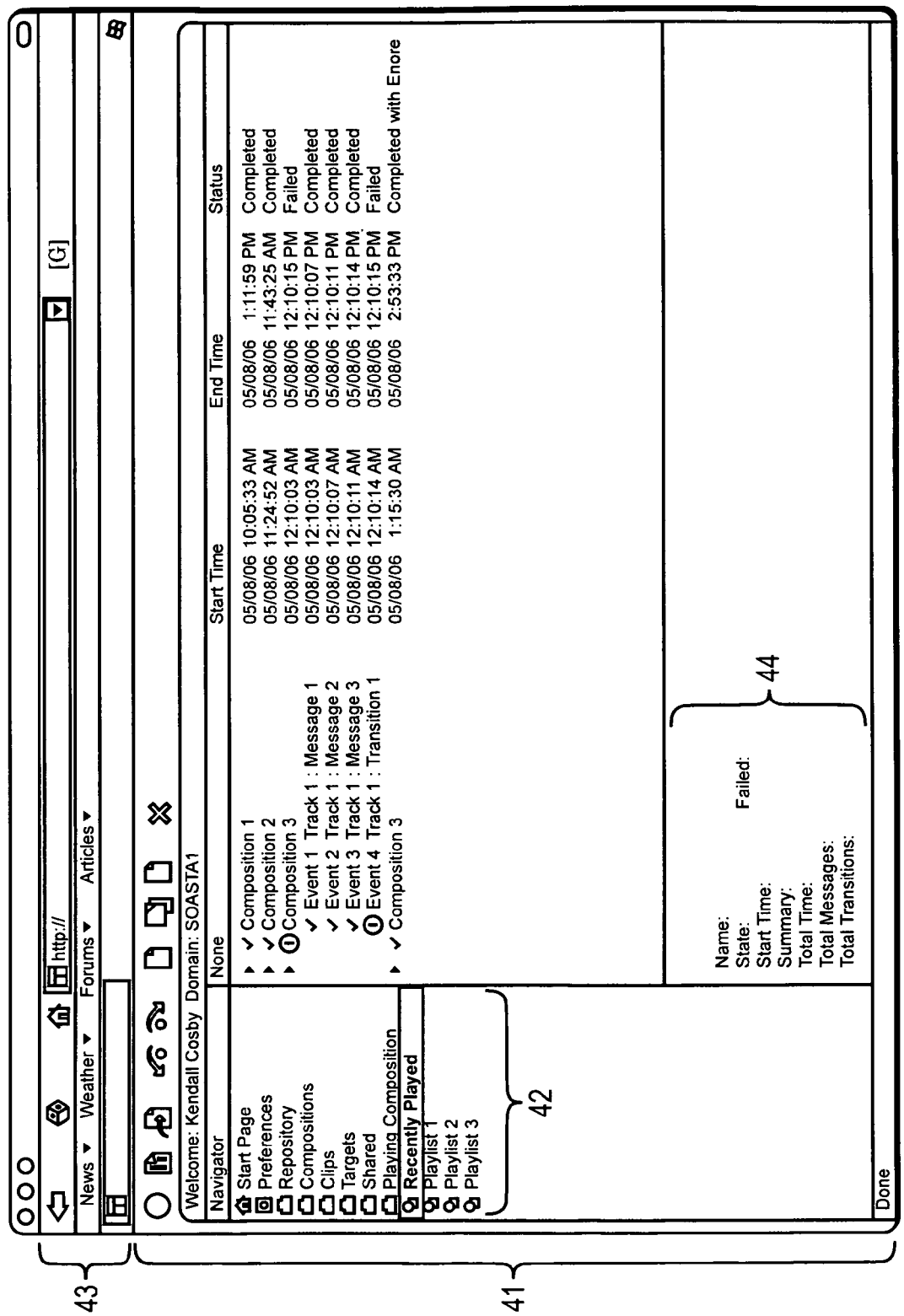
FIG. 4 illustrates an example file manager component of a graphical user interface.

FIG. 4 illustrates an example file manager graphical user interface page that includes a browser menu bar area 43 and a workspace 41 having various areas and lines for displaying information, entering commands, and managing files. In this example, the top line of workspace 41 includes selection icons to create, save, undo and recreate a composition. A welcome message near the top of workspace 41 indicates that this particular user is named "Kendall Cosby." The same line also indicates the tenant or domain that the user is working within, in this case, is "SOASTA1."

Workspace 41 also contains a left-hand side navigator menu area 42, with menu items such as "Preferences," "Repository," "Compositions," etc. Clicking on an item in the list shows some sort of summary display (on the right-hand side of the window) appropriate to the item type. Operations on items may be performed through the summary display on the right-hand side of workspace 41. Thus, a user may select from individual menu items in menu area 42 to open a new page in the GUI. Note that in the described embodiment, the repository items seen by a user depends upon their administratively assigned privileges/permissions.
Administrators can See all Items The example of FIG. 4 illustrates the case of a user who has selected "Recently Played" compositions. The result, shown to the right of the navigator menu area in workplace 41, is a detailed depiction of recently played compositions. This example further illustrates a user having selected "Composition 3", thereby resulting in a listing of the details of each event played in Composition 3. Note that these details include start and end times for each message, and whether each message has completed or failed. Start and end times for non-selected recently played compositions are also shown in workplace 41, including whether these compositions have completed or failed.

A "Composition Summary" area 44 for "Composition 3" is also provided. Summary area 44 indicates the state of a selected composition state (i.e., "failed"), and may include specifics such as start time, a total time it took to play the composition, the number of messages and transitions within the composition, and other information.

Figure 5:
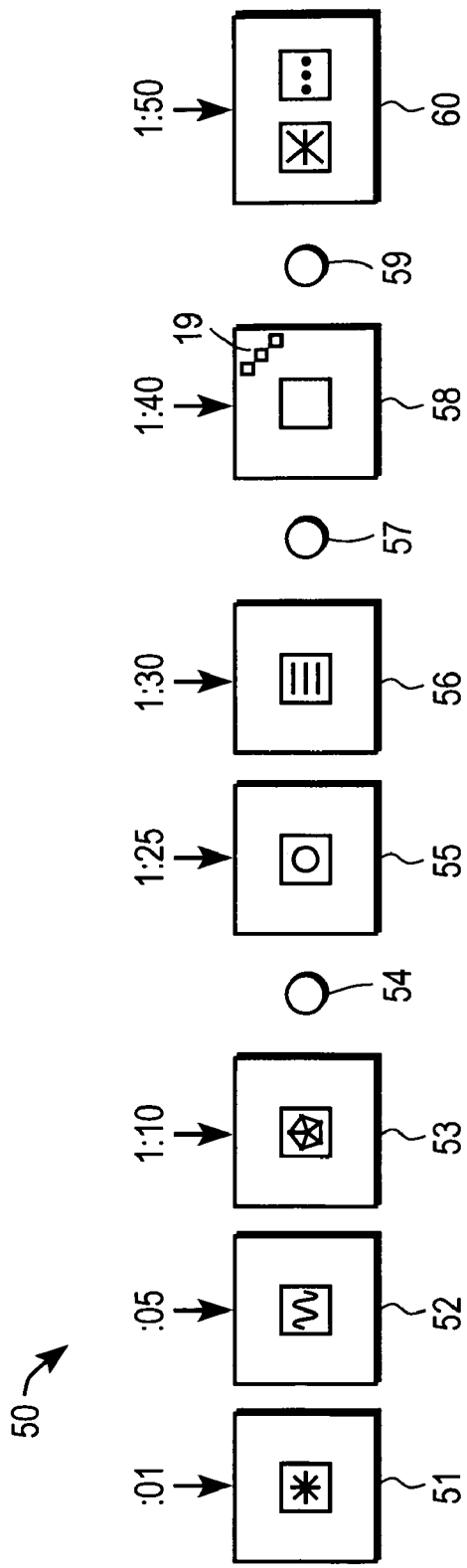
FIG. 5 illustrates a message clip component user interface for a time-based message clip.

FIG. 5 illustrates a message clip component user interface for a time-based message clip. In this example, the message clip user interface shows a time-based message clip 50 being edited. Message 51 is sent at time t=0:01, followed by message 52 at time t=0:05, and then message 53 at time t=1:10. A transition 54 is then executed as part of the sequence. After transition 54, a message 55 is sent at time t=1:25, followed by a message 56 at time t=1:30. Another transition 57 is then executed. At time t=1:40 a nested message 58 is sent followed by another transition 59. Finally, a dependent group of two messages 60 is sent after transition 59. In one embodiment, more than one message can be sent at one time; for example, by the user interface inputting an "expand" item command.

Messages may be any type of electronic message. For example, message 51 may comprise instructions to log into a particular web service. Message 52 might comprise an instruction such as "add a customer whose name is Benjamin and whose email address is benjamin3124@yahoo.com." Message 53 might comprise an instruction such as "fetch me the customer name Benjamin" (to test whether the user gets the name back, as he should if the system is working properly), and so forth. Messages are visually defined using the GUI in the order the user specifies them to be sent. Once defined, messages may be saved as a reproducible composition which may be played and replayed. In the above example, the web service being tested by the composition either succeeds or fails accordingly.

In addition, message clips placed in a composition may be linked. When a user places a message clip within a composition, he may simply refer to it by name (i.e., if a particular message clip has already been created and a user would like to use the same message clip). If this message clip is changed by user, then anyone who subsequently uses this same message clip by name in a composition sees that change. Such a message clip is called a linked message clip. The composition may point to or select a message clip by name in order to have it played. An icon may be used to let a user know of a particular message clip within a composition is linked or embedded.

A user may also utilize message clips within other message clips in a nested fashion, such as message clip 58, which is another message clip being included within message clip 50. Nested message clips allow a user to reuse message clips within other message clips. Clips can also be used multiple times by placing a clip icon in a track multiple times. Nested Clips may be used to build up re-usable units of work based on smaller units.

Figure 6:
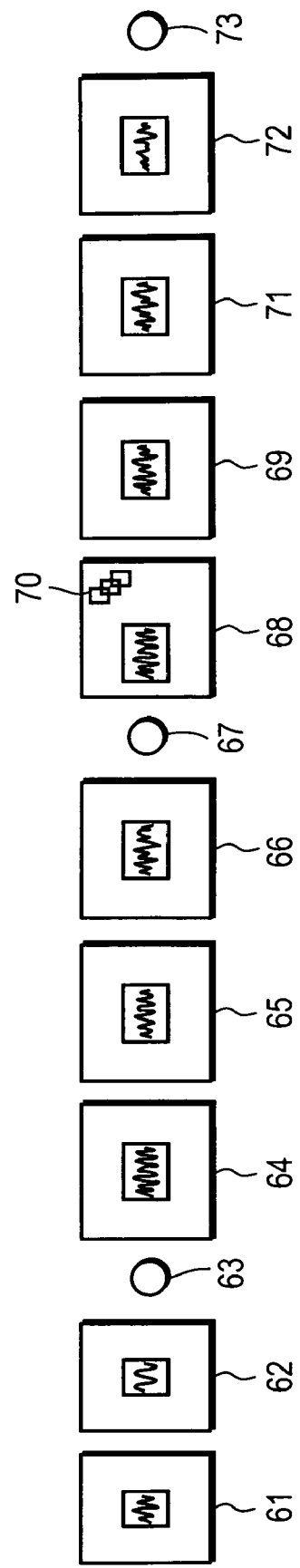
FIG. 6 illustrates a message clip component user interface for a sequenced message clip.

FIG. 6 illustrates a message clip component user interface for a sequenced message clip. Two messages 61 and 62 are shown being sequentially sent. A transition 63 is then executed, followed by the sending of three messages 64-66. After another transition 67, a nested message clip 68 is played. (An icon 70 in the upper right corner of message clip indicates that that the message is a nested message clip.) This is followed by three more messages 69-72. Finally, a transition 73 is shown at the end of the sequence.

Message clip editor 31 may be used to edit message clips such as those illustrated in FIGS. 5 and 6. In one implementation, the message clip GUI page provides a user with the ability to drag messages and transitions around to rearrange the ordering; to cut, copy, and paste messages and transitions; to insert a new message and/or transitions and edit an existing message and/or transition; to delete existing message and transition; and to create a dependent group of messages.

Figure 7A:
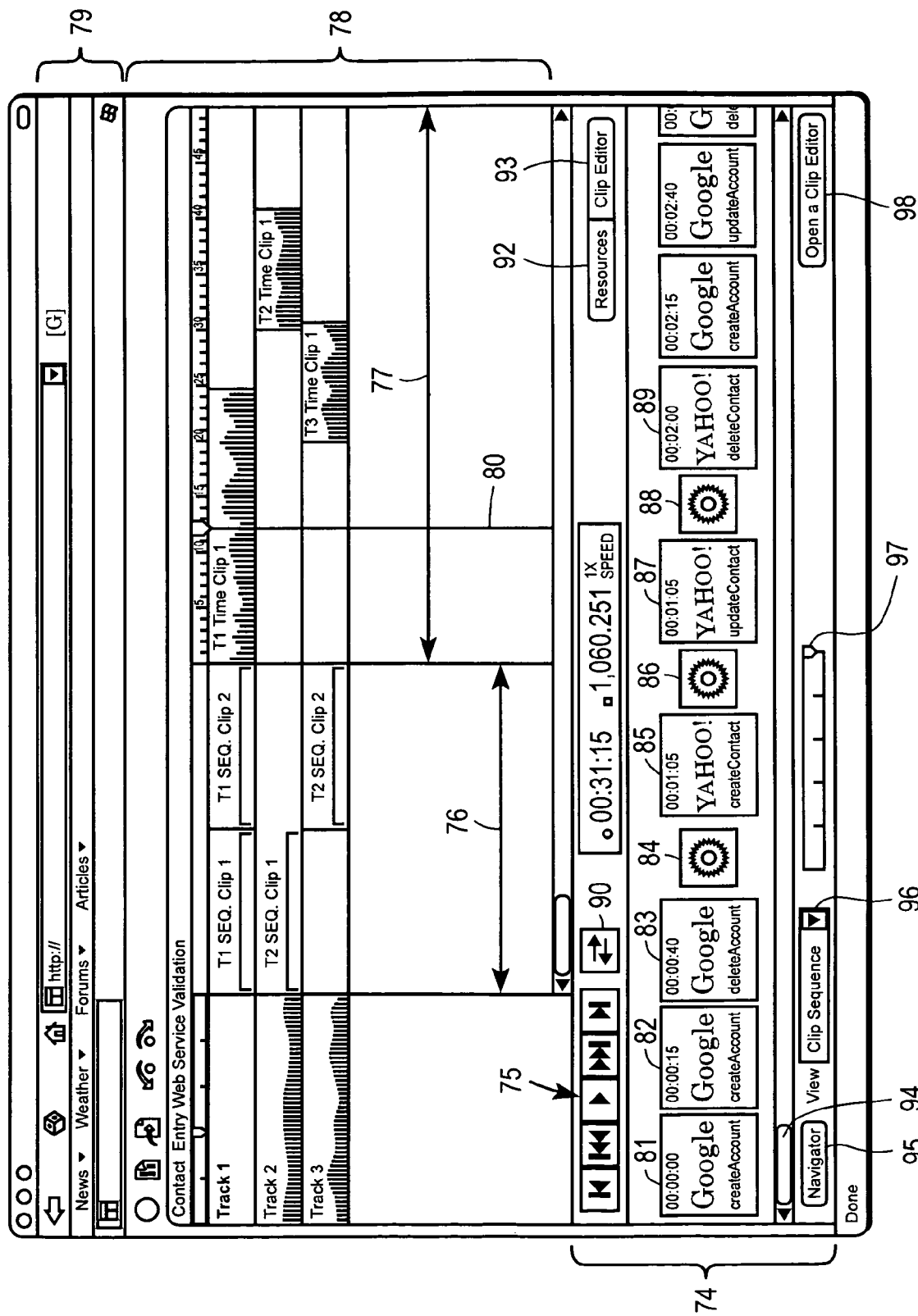
FIGS. 7A & 7B illustrate a composition editor component of an exemplary graphical user interface.

FIG. 7A illustrates a composition editor component of an example graphical user interface which includes a browser menu bar area 79, a workspace 78 and a control panel area 74.

The composition illustrated in FIG. 7A is entitled "Contact Entry Web Service Validation." Workspace 78 shows "Track 1", "Track 2", and "Track 3" being played as part of a single composition. (It is appreciated that Tracks 1-3 are default names; a user may choose any name for Tracks 1-3, and any name for the composition.) Messages clips may comprise multiple messages consisting of sequenced message clips (e.g., T1 Seq. Clips 1&2, T2 Seq. Clip 1, and T3 Seq. Clip 2) and time-based message clips (e.g., T1 Timed Clip 1, T2 Timed Clip 1, and T3 Timed Clip 1). The sequenced message clips are shown in a band 76 of FIG. 7A, with the time-based message clips being shown in a band 77. The time-based message clips play in sequence according to a timeline or "playhead" 80 that moves progressively across the screen. The timeline scale shown at the top of band 77 may be configured to play messages according to seconds, hours or even days. To build a composition a user may drag and drop message clips to various tracks in workspace 78. Messages are typically played from left to right in workspace 78, beginning with the sequenced message clips. When the sequenced message clips have finished playing, the time-based message clips may begin playing according to the configured timeline scale.

Although FIG. 7A illustrates two bands 76 and 77, it is appreciated that there may be many more bands in a given composition. Each message in a band is played in sequence before the next band begins.

In the time-based message clips of FIG. 7A, the height and number of the vertical columns of dots represents the message density of each message clip; that is, how many messages are in each message clip and how they are distributed). Although the time-based message clips shown in FIG. 7A are evenly distributed, it is possible to have a time-based message clip with a cluster of messages in the beginning and then a gap, for example, or multiple clusters of messages with gaps between the clusters, or any other type of cluster arrangement.

Control panel area 74 contains a set of arrows 75 that allow a user to play a composition, to backtrack to an earlier portion of composition, and/or fast forward to a part of the composition that has not yet been played. A user may browse and edit a composition using Resource and Clip Editor buttons 92 & 93, respectively, shown at the right-hand side of control panel area 74. A continuous play button 90 in control panel area 74 allows a user to play the composition over and over again. A digital clock (shown just to the right of button 90) may optionally be included in control panel field 74 to track elapsed time since the beginning of the composition. In this example, 31 minutes and 15 seconds have elapsed since the start of play. A portion of control panel area 74 also indicates how many messages have been sent since the start of play and at what speed messages are being played. According to the example illustrated by FIG. 7A, 1,060,251 messages have been sent at 1× speed.

In one implementation, one or more control buttons may be included that allow a user to change the speed at which messages are applied—in other words, to send messages to various destinations faster or slower than 1× speed. In addition, a special "goal seeking" command icon or button may be included to run a composition over and over, each time at a progressively faster pace and/or volume, until the target device (e.g., a server or application) fails or crashes. The point in the test where the target fails may be stored and visually displayed via the GUI in a report that includes statistics on the response time of the target under test. Such a feature is useful in determining the capacity or robustness of a particular target or target/location pair.

In the example of FIG. 7A, the message clip editor is open, as indicated by the string of message icons 81-89 displayed at the bottom of control panel area 74. A user may edit any message clip at any time. In the example shown, the T1 timed message clip 1 is being edited by the user. Icons 81-89 (with Google™ and Yahoo!™ names) represent the individual messages in the T1 timed clip 1. A message represented by Google™ icon 81, for instance, is shown sent at the start of time-based message band 23 at time t=00:00:00. Icon 27 comprises a message to "create Account" that is sent to a Google server. At time t=00:00:15 a message to "update Account" is sent to the Google server, as represented by icon 82. Similarly, at time t=00:00:40 a "delete Account" message is sent to the Google server, as represented by icon 29.

Note that transitions may occur at various points in a message clip. For example, a transition 84 is shown occurring between icons 83 & 85; a transition 86 occurs between icons 85 and 87; and a transition 88 occurs between icons 87 & 89. A user may scroll to the left and right to see additional messages (not shown in this view) in T1 timed message clip 1. Although messages are illustrated being sent to Google and Yahoo servers in FIG. 7A, a user may send messages to any number of different servers or other network nodes/devices. A user may also send messages in a composition to multiple servers within a given enterprise or entity, such as Google.

A scroll button 94 in control panel area 74 allows a user to scroll the visual field of the user interface left or right. A view pull-down button 96 allows a user to view message clips in a variety of different ways. The view in FIG. 7A shows messages as boxes with the time the message starts indicated at the top of each box. However, messages in a different view may be placed on a timeline (e.g., so that the message illustrated by icon 82 is further to the right than it is shown in view of FIG. 7A). A slider arrow button 97 at the bottom of control panel area 74 may be used to zoom in and out, i.e., to visually display more or fewer images on the GUI screen. Clicking on button 98, entitled "Open in Clip Editor", opens the full clip editor, as described in conjunction with FIG. 8.

Figure 7B:
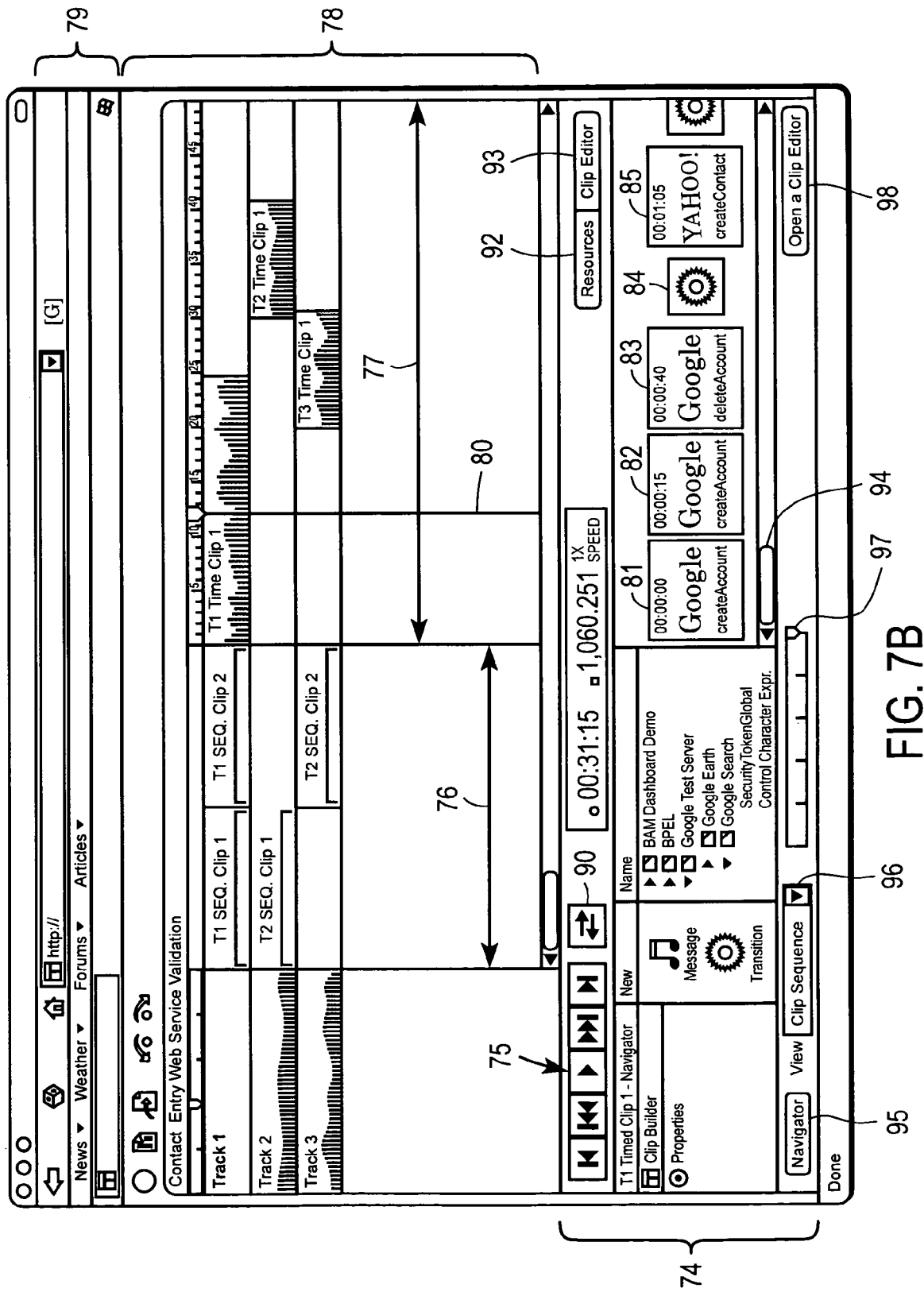

FIG. 7B illustrates the message clip editor component of FIG. 7A with a navigator feature open. The navigator feature may be opened by "clicking" or selecting button 95. The fact that navigator feature is open as indicated by the notation shown near the top-left of control panel area 74 (i.e., "T1 Timed Clip-1—Navigator.").

A user may edit message clips by clicking on various options provided in the navigator menu area. In this example, user has clicked on "Clip Builder" to make changes and/or create new messages and transitions within the T1 timed clip 1. A user who wants to create a new message in the T1 timed clip 1 may click on the musical note icon under the "New" heading in control panel field 74. A user may click on the gear wheel icon (under the musical note icon) to create a new transition. User may also click on "Targets" to change and/or edit the message targets (i.e., the Google and/or Yahoo servers) defined in T1 timed clip 1.

A user may also click on the "Properties" selection to change, edit or create message properties, which are name-value pairs. The user may specify that when a composition is played property values are to be substituted into messages before they are sent, and are to be extracted from message responses when they are received. For example, when the message represented by icon 81 to "create Account" is played, this message may take a data item that was returned from the operation and put it into a property for reuse later. For instance, the Google server may return an account number after receiving the message represented by icon 81 to "create Account" that may be placed in a property. Thereafter, the message represented by icon 82 to "update Account" reads that property and uses that data to determine which account to update. This property setting and retrieval can also involve simple value modification such as "MyInt+1"; or "CurrentDate.year;( )" or "MyString.last (5)", or even pulling in values from environment variables or other external sources. Through control panel 74 the user may also specify that a script (or "macro") may be executed before the message is sent and after the response is received. These scripts may also set and/or fetch these property values. In addition, transitions placed between messages in the clip may include scripts that fetch and set these property values.

In the example of FIG. 7B, control panel area 74 also displays a tree structure under the "Name" heading that lists saved/reusable objects in a user's repository. These folders may have a variety of objects in them, such as pre-defined compositions, messages clips, etc. Pre-defined transitions in this particular user's repository include "Security Token Global" and "Control Character Expr." Any of these transitions may be dragged and dropped over to the message clip for insertion therein.

Figure 8:
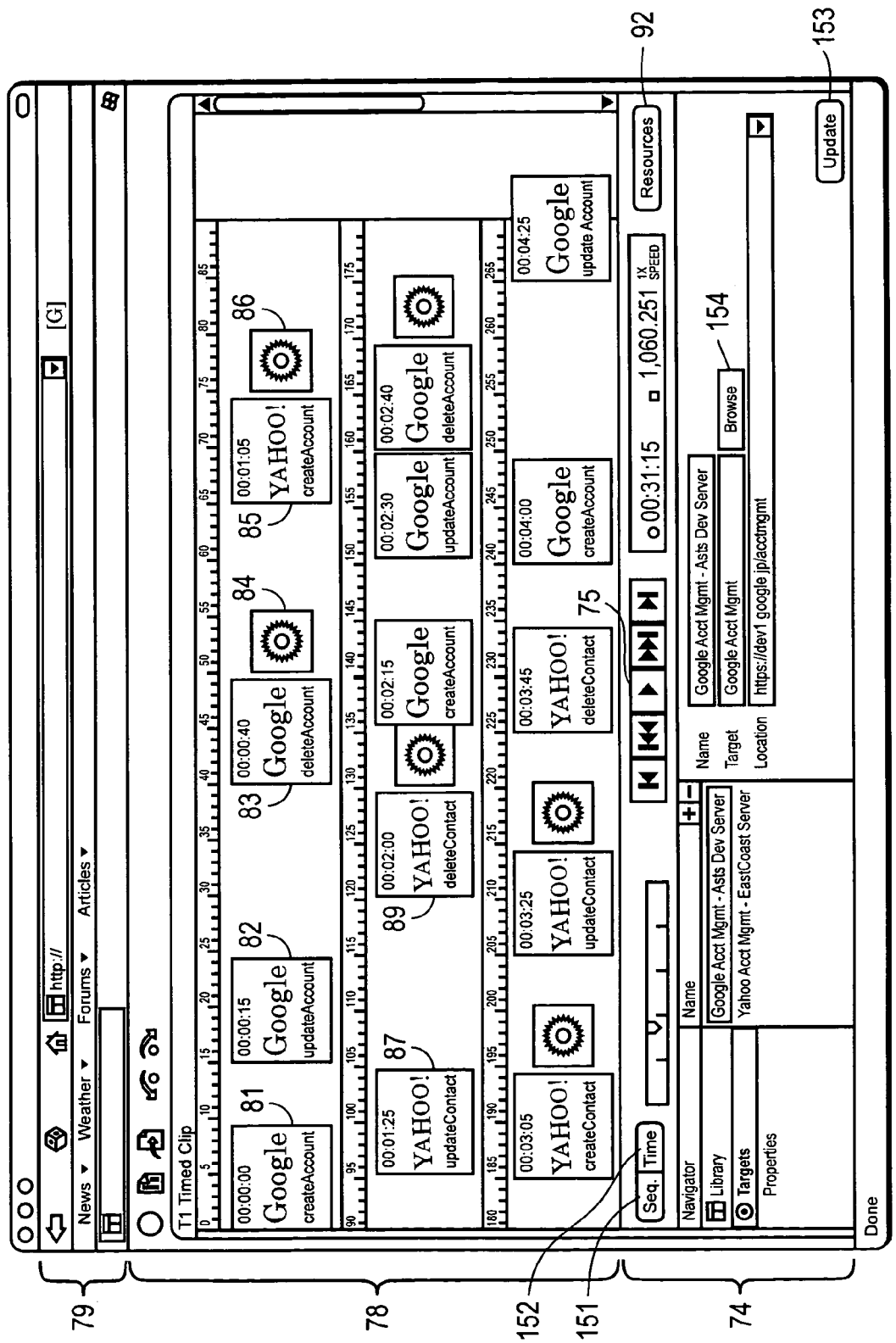
FIG. 8 illustrates a full clip editor component of an example user interface.

FIG. 8 illustrates a full clip editor component of an example user interface having a workplace 78 contains message clip icons (e.g., icons 81-89) and a number of transitions (e.g., transitions 84 & 86). Rather than having to scroll left and right to view messages and transitions in a message clip, messages are snaked across workplace 78 in rows. Sequence button 151 and Time button 152 may be used to toggle between the sequence view and timeline view for a time-based clip. The example of FIG. 8 shows a time view. Upon switching to a sequence view (i.e., by pressing or clicking on button 151), the time scale along the top of each row disappears, and the individual messages are shown in their sequential order without time gaps between them. In the full clip editor, a user edits one message clip at a time. Note also that in the event that a user presses the "Seq." button 151 while a timed message clip is being edited, then the T1 timed clip 1 is transformed into a sequenced message clip. Alternatively, a sequenced message clip could be transformed into a time-based message clip by assigning some default initial timing to the messages. Pressing "Resources" button 92 causes the Navigator section in area 74 to be shown or hidden. "Update" button 153 allows a user to save any edits/changes that have been made via the full clip editor.

In the example of FIG. 8, a user has clicked on "Targets" to show the targets that are defined (i.e., Google and Yahoo servers) under the "Name" heading in control panel area 74. Highlighting the Google entry (as shown by the rectangular box) results in a display of detailed information about the target. The name, target, and location of the "Google Acct Mgmt-Asia Dev Server" are displayed in the lower, right-hand side of control panel area 74. A user may also click on "Browse" button 154 to see other targets displayed in the "Target" area.

Figure 9:
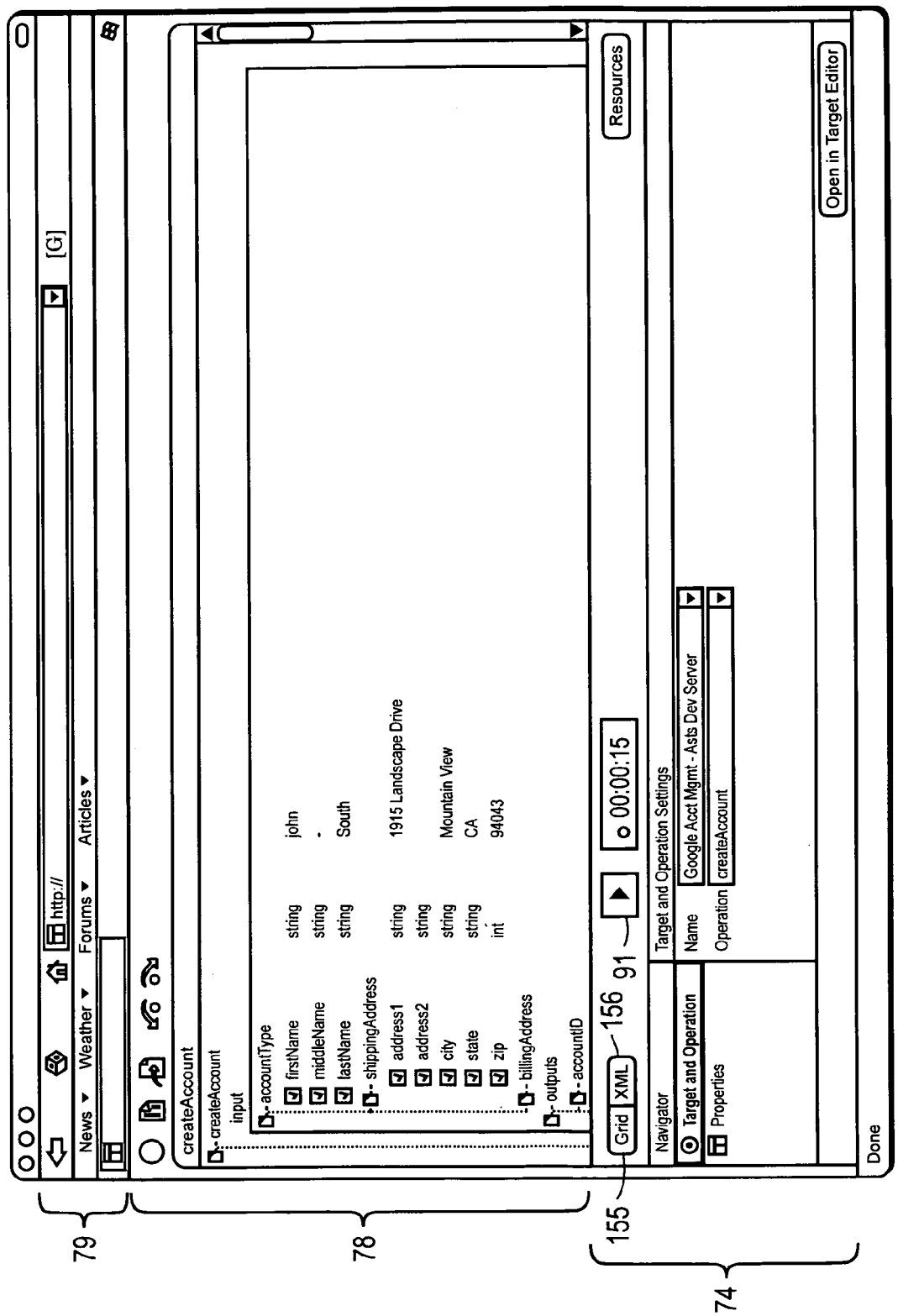
FIG. 9 is a message editor user interface in accordance with one embodiment of the present invention.

FIG. 9 illustrates a message editor component of an example user interface page which shows every message sent by the system to a target (such as the Google server in FIG. 9) being placed in a certain specified format required by the target. The target communicates the required format to the system (e.g., using Web Services Description Language "WSDL"). When a user creates the target the user may send a message that queries the target about the required format. In response, the target sends the user the appropriate format description.

In the embodiment illustrated by FIG. 9, the target is a Google account service that has a particular structure which requires a user to enter a name and address for the new account holder in designated areas within workplace 78. The word "string", for example, prompts the user to enter the data in text format. Under "first Name" the user enters "John" in text format in the designated area. When data is to be entered in numeric form, the prompt "int" is utilized, such as when user is prompted to enter the new account holder's zip code. In addition, rather than user having to enter the hard coded state (e.g., entering "CA" all the time for "State" under the "Shipping/Address" portion of FIG. 9) a user can create a property or use a property that has already been created to get the value out of the property to be sent in the message to the server.

The "outputs" section of the message editor is information that is expected to be received back from the server after the server receives the "create Account" message. A user could select the "account ID" of the "outputs" section and specify that it is to be placed into a property when the message response is received. For instance, after a user sends the "create Account" message to the Google server, the server may send an account ID for the new account holder back to the system, where it is stored in the "outputs" section of the message editor. The next sequenced message clip "update Account" may then extract the value in this property (e.g., account ID number) and send that value or data item in its message.

"Grid" button 155 and "XML" button 156 provide two different ways of viewing a particular message, e.g., "create Account". A user may click on "XML" button 156 to view raw data. Alternatively, in the example of FIG. 9 "Grid" button 155 has been selected. (It is appreciated that the names of the buttons may change, depending upon the particular target of the message. For example, some targets may have raw, underlying data that is in a different format than XML, so the button may be labeled something other than "XML".) A "play" button 91 allows a user to play out just this one message. The digital clock shown to the right of button 91 indicates the amount of time that it took to play the message, in this case time t=00:00:15.

In a control panel area 74 of FIG. 9, the user has highlighted "Target and Operation" to view the target that this message will be sent to (i.e., "Google Acct Mgmt-Asia Dev Server") and also to view the message type (i.e., "create Account"). Highlighting "Properties" in control panel area 74 allows a user to view a list of all properties found in this particular message.

Figure 10:
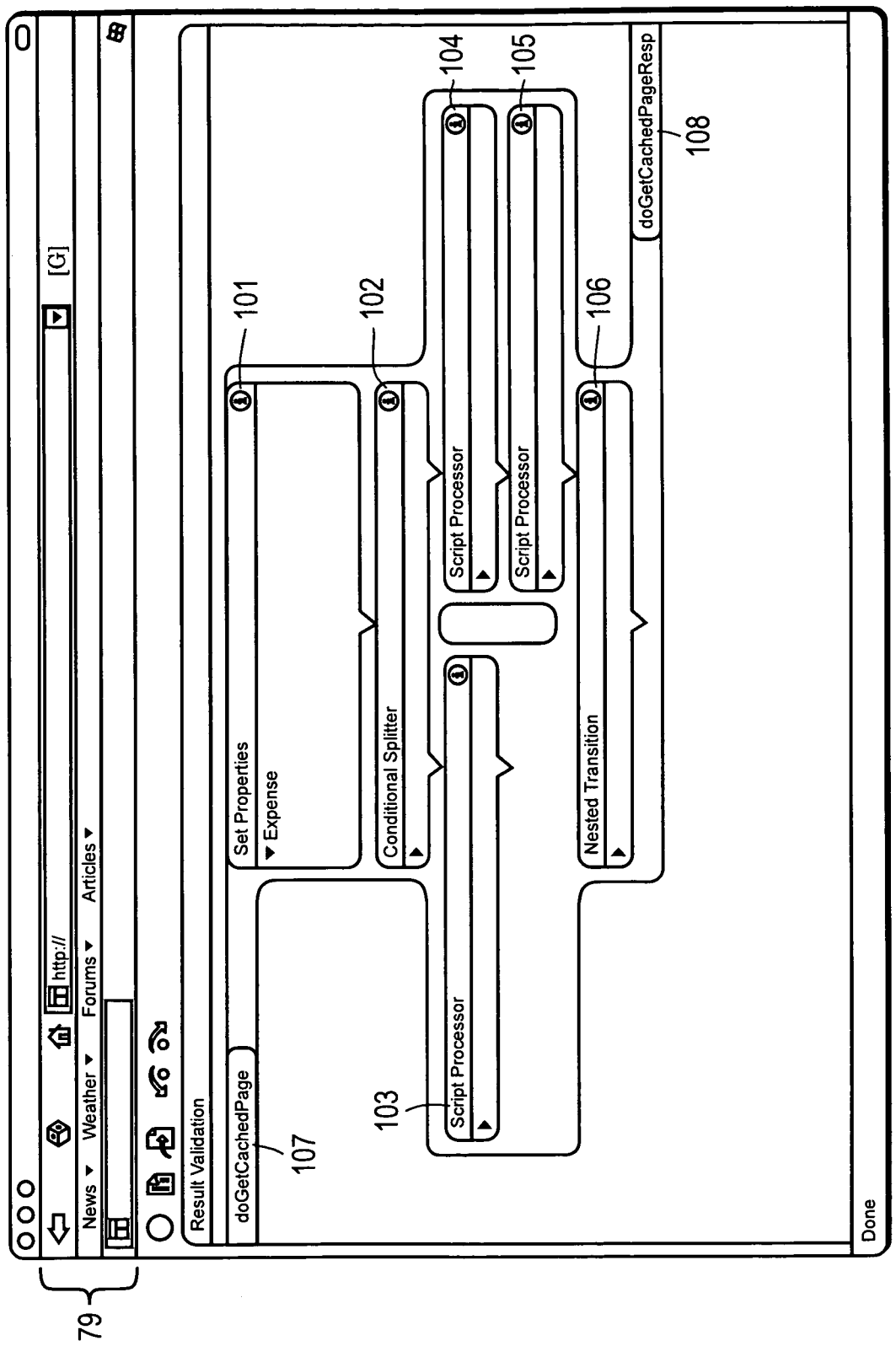
FIG. 10 illustrates a transition editor component of an example user interface page.

FIG. 10 illustrates a transition editor component of an exemplary user interface page that allows user to automatically create scripts (without having to actually write the script code) in multiple languages such as JAVA and Perl. The scripts (i.e., transitions) may be inserted in various places in the composition as discussed above. There may be multiple different views provided by the transition editor. The view of FIG. 10 illustrates a GUI for generating a script. Another view allows a user to see and edit the actual scripts.

Transitions may comprise special logic between two messages in a message clip. For example, if a first message sent to a server requests an account ID from the server, and the account ID received back from the server is encrypted in a secret form that needs to be decrypted or transformed in some way in order to send in the next message, then a transition between these two message may include a script to decrypt or transform the account ID.

In the embodiment shown, a user may set values into properties (e.g., arithmetic computations) in a set properties field 101. A conditional splitter 102 allows a user to express "if-then-else" logical conditions. For instance, a script processor field 103 on the left side of the screen shot could be the "then" portion of the statement, with script processor fields 104 and 105 on the right side of the screen shot specifying the "else" portion. Nested transition field 106 may be used to execute a subroutine (i.e., a transition that calls another transition).

The example of FIG. 10 also shows a "do Get Cached Page" icon 107 to indicate where in a composition the particular transition being edited by the transition editor may be used. In other words, "do Get Cached Page" icon 107 is the message to be played before this particular transition is executed and "do Get Cached Page Resp" icon 108 is the message to be played after this transition is executed.

Practitioners in the art will appreciate that there are numerous events that may occur during the play out of a composition (e.g., composition starting, ending, a track starting, a clip starting, a clip failing, etc.). For each of these events, a user may use transition editor to specify a conditional transition to be executed when a specified event occurs. For instance, user may create a transition to be executed every time a particular message clip begins playing. Or, user may create a transition to be executed every time a particular message send fails.

Figure 11:
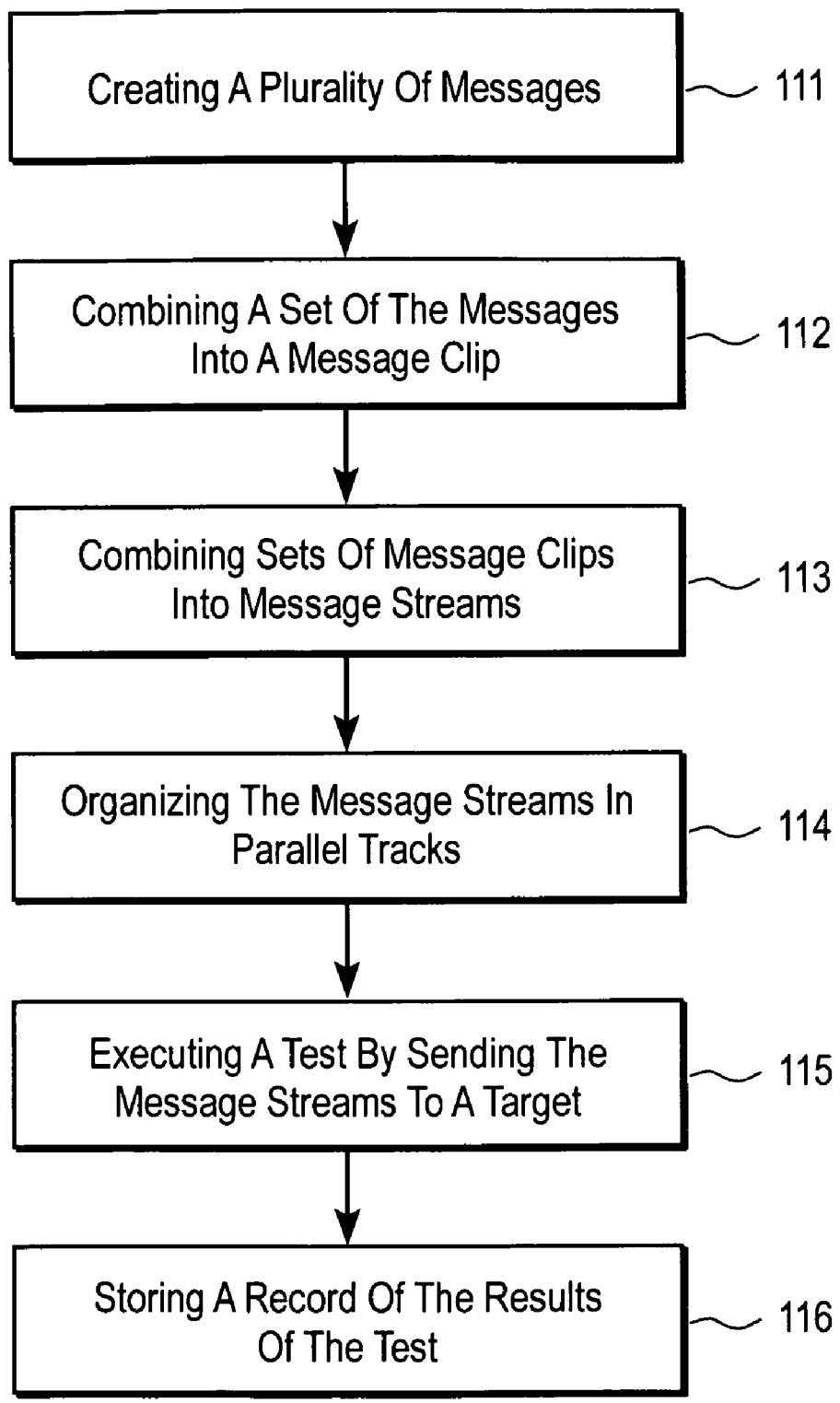

FIG. 11 illustrates a method for creating a composition. The example of FIG. 11 begins with the step of creating a plurality of messages (block 111) aimed at testing the performance and/or capacity of a target, e.g., a website application. A set of the message are then combined into a message clip (block 112). Once a set of message clips has been created, they may be combined to form one or more message streams within the tracks (block 113). As discussed previously the message streams may be timed or sequenced, and are organized in parallel tracks using a graphical user interface. The step of organizing the tracks into a composition is represented by block 114. The test is executed by simultaneously transmitting the message streams in each parallel track to the target of the test (block 115). The results of the test received back from the target are stored as a record in a repository for later viewing by a user of the GUI (block 116).

Figure 12:
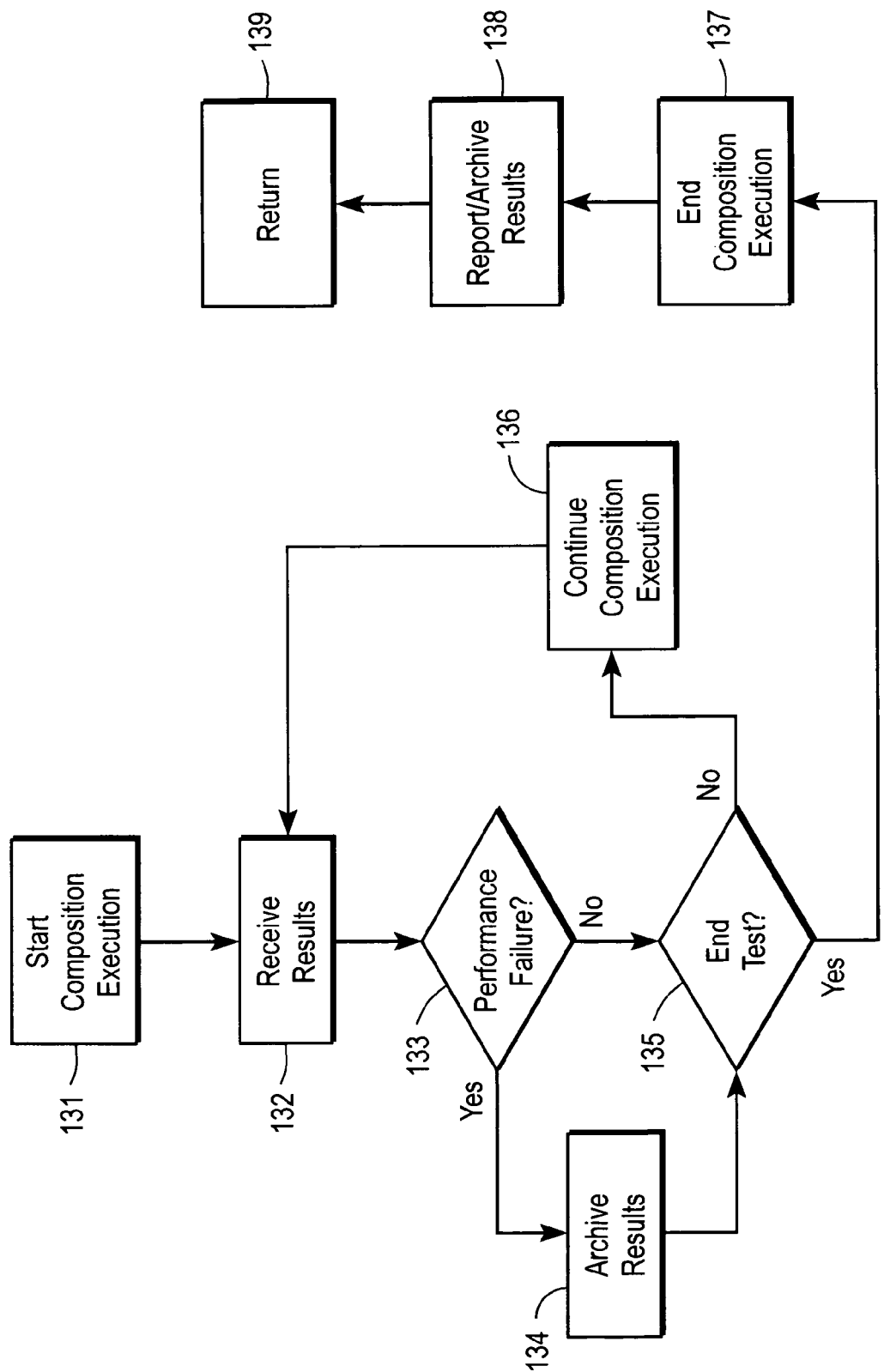
FIG. 12 illustrates a method for executing a composition in accordance with one embodiment of the present invention.

FIG. 12 illustrates another method for executing a composition aimed at testing the performance and/or capacity of web service, e.g., a server. After the composition (i.e., test) has started execution (block 131), results are produced and then received back at the computer that is executing the composition (block 132). The receiving computer analyzes the results and makes a determination as to whether the information received indicates a failure of a performance level or failure to adhere to an expected behavior of the server (block 133). If a failure occurs during execution of the composition, the results are archived in a report (block 134) and eventually returned to the user (block 139). After archiving of the results, or, alternatively, while the composition continues to run without a performance failure, a determination may be made by the computer to either halt or continue playing the test (block 135).

If the composition is to be halted, then the test is stopped, i.e., the execution of the composition is ended (block 137). Alternatively, the composition may continue to be played (block 136), repeating the above steps of receiving results and monitoring for a failure. Additionally in block 136, performance statistics may be archived before continuing with the test. Eventually, the composition ends one way or another (block 137), after which time the results are archived in a report (block 138) and returned to user (block 139).

Figure 13:
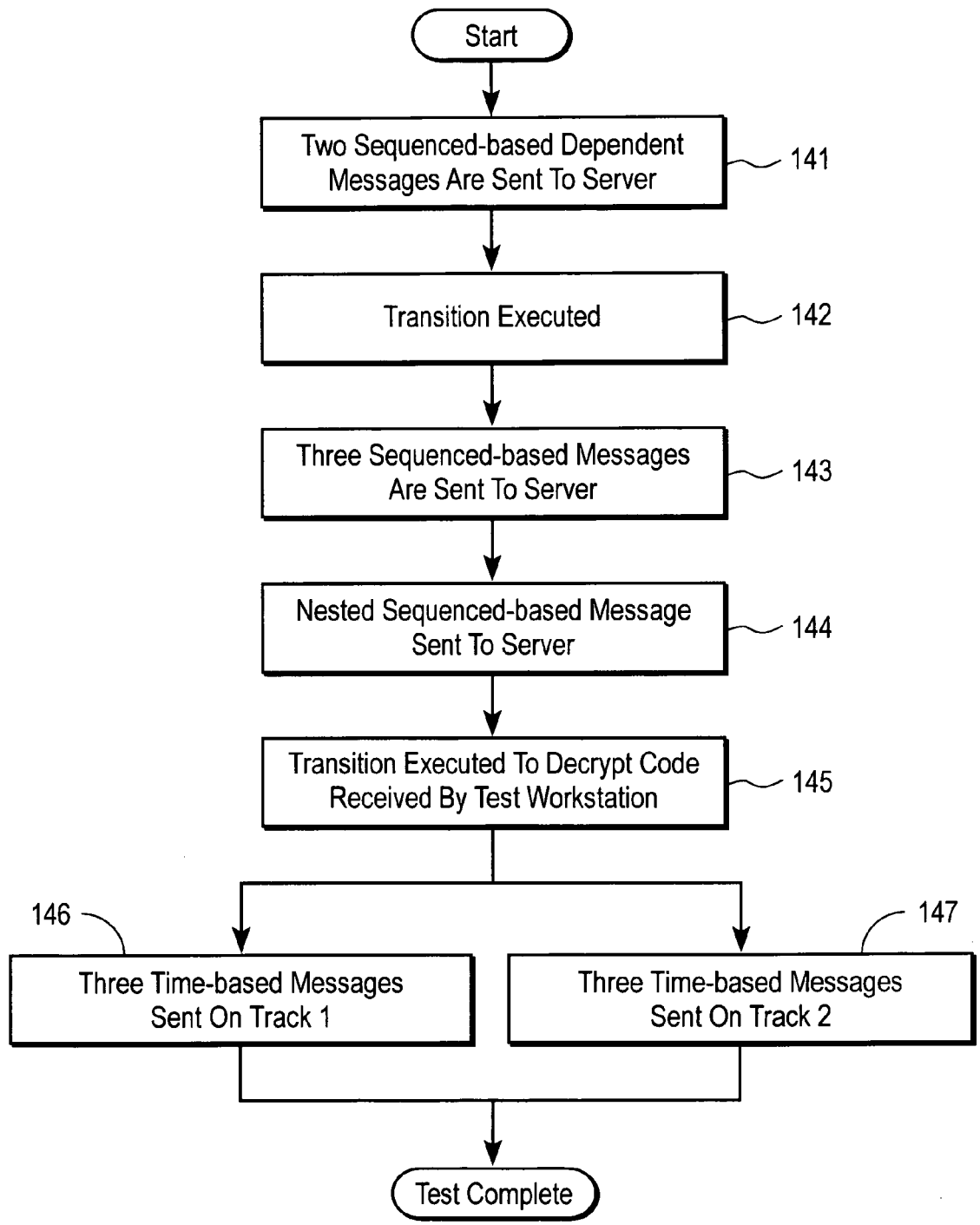
FIG. 13 illustrates another method for executing a composition in accordance with one embodiment of the present invention.

FIG. 13 illustrates another method for executing a composition. The method of FIG. 13 involves the execution of a composition that begins with two sequenced messages being sent to a server one after the other (block 141), after which time a transition is executed (block 142). Next, three sequenced-based messages are sent to the server (block 143), followed by three sequenced messages sent to server one at a time (block 144). At this point in the process, a transition is executed to decrypt coded information as a response to one or more of the messages received by a workstation (block 145), e.g., a computer running code that implements the GUI described above for executing the test/composition sequence. After the code has been decrypted, three time-based messages are sent on Track 1 (block 146) and three time-based messages are also sent in parallel on Track 2 (block 147). When both blocks 146 & 147 have completed, the test is done.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method comprising:
providing a graphical user interface (GUI) that allows a user to generate a composition by placing icons, each icon instantiating a message clip, on one or more tracks, each track corresponding to a timed sequence of message clips; and
executing the composition from the GUI, thereby causing the plurality of message clips to be sent over a network to a target, the plurality of message clips for performing a test on the target.

2. The computer-implemented method of claim 1 wherein the tracks are arranged in a substantially parallel manner.

3. The computer-implemented method of claim 2 wherein the tracks are divided into sequentially-based bands.

4. The computer-implemented method of claim 2 wherein the tracks are divided into time-based bands.

5. The computer-implemented method of claim 1 wherein the GUI further provides the user with an option to insert a transition on a track between a first message clip and a next message clip in the timed sequence of message clips, the transition comprising one or more specified actions to be taken between the first message clip and a next message clip.

6. The computer-implemented method of claim 5 wherein the transition is expressed in a script programming language.

7. The computer-implemented method of claim 6 wherein the script programming language is a JAVA scripting-based programming language.

8. The computer-implemented method of claim 1 wherein the GUI further provides the user with an option to change a speed of execution of the composition as the composition is playing.

9. The computer-implemented method of claim 1 wherein the UI further allows the user to set a length of time for execution of the composition.

10. The computer-implemented method of claim 1 wherein the GUI further allows the user to link a composition to other compositions, thereby creating a playlist.

11. The computer-implemented method of claim 10 further comprising storing results of the test for all compositions in a repository.

12. The computer-implemented method of claim 1 further comprising analyzing the results of the test while the composition is being executed to determine whether a performance failure has occurred.

13. The computer-implemented method of claim 12 wherein the performance failure comprises a failure to adhere to an expected behavior of the target.

14. The computer-implemented method of claim 13 wherein the target comprises an application.

15. The computer-implemented method of claim 13 further comprising determining, while the composition continues to be executed, whether to halt the test.

16. The computer-implemented method of claim 1 further comprising:
launching a different composition from a message clip in the composition; and
recording results generated from the different composition and the composition in a single repository.

17. A non-transitory computer-readable storage medium encoded with a computer program, which, when executed, is operable to:
produce a graphical user interface (GUI) on a display, the GUI providing a user with an ability to generate a composition by placing icons, each icon instantiating a message clip, on a plurality of tracks, each track corresponding to a sequence of message clips, each message clip comprising a set of one or more sequenced messages;
execute the composition responsive to input received from the GUI, execution of the composition causing the plurality of message streams to be sent over a network to a tar the plurality of message streams for performing a test on the target; and
analyze results of the test while the composition is being executed to determine whether a performance failure has occurred.

18. The non-transitory computer-readable storage medium of claim 17 wherein the GUI further provides the user with an option to change a speed of execution of the composition as the composition is playing.

19. The non-transitory computer-readable storage medium of claim 17 wherein the performance failure comprises a failure to adhere to an expected behavior of the target.

20. The non-transitory computer-readable storage medium of claim 17 wherein the computer program, when executed, is further operable to determine, while the composition continues to be executed, whether to halt the test based on the analysis of the results.

21. The non-transitory computer-readable storage medium of claim 17 wherein the GUI further provides the user with an option to insert a transition on a track between a first message clip and a next message clip in the sequence of message clips, the transition comprising one or more specified actions to be taken between the first message clip and a next message clip.

22. The non-transitory computer-readable storage medium of claim 21 wherein the transition is expressed in a script programming language.

23. The non-transitory computer-readable storage medium of claim 17 wherein the script programming language is a JAVA scripting-based programming language.

24. The non-transitory computer-readable storage medium of claim 17 wherein the GUI further provides the user with an option to set a length of time for execution of the composition.

25. The non-transitory computer-readable storage medium of claim 17 wherein the GUI further allows the user to link a composition to other compositions, thereby creating a playlist.

26. The non-transitory computer-readable storage medium of claim 17 wherein the computer program, when executed, is further operable to store results of the test for all compositions in a repository.

* * * * *